United States Patent [19]
Koike

[11] Patent Number: 5,892,984
[45] Date of Patent: Apr. 6, 1999

[54] PHOTOGRAPHIC LENS AND CAMERA

[75] Inventor: Kazumi Koike, Kanagawa, Japan

[73] Assignee: Fuji Photo Film Co., Ltd., Kanagawa, Japan

[21] Appl. No.: 6,822

[22] Filed: Jan. 14, 1998

[30] Foreign Application Priority Data

Jan. 20, 1997  [JP]  Japan ................................ 9-007271

[51] Int. Cl.$^6$ ........................................... G03B 17/02

[52] U.S. Cl. .................. 396/6; 396/439; 359/717

[58] Field of Search ........................ 396/6, 439, 440, 396/442; 359/708, 716, 717

[56] References Cited

U.S. PATENT DOCUMENTS

| 5,067,803 | 11/1991 | Ohno | 359/708 |
| 5,631,777 | 5/1997 | Mori | 359/717 |
| 5,689,376 | 11/1997 | Lewis | 359/717 |
| 5,739,965 | 4/1998 | Ohno | 359/717 X |

*Primary Examiner*—Howard B. Blankenship
*Attorney, Agent, or Firm*—Young & Thompson

[57] ABSTRACT

A photographic lens consists of a first meniscus lens element having a concave surface directed to the image, and a second meniscus lens element having a concave surface directed to the object, arranged in this order from the object side. Both surfaces of the first lens element are spherical, and at least one surface of the second lens element is aspherical. The absolute value of the focal length of the first lens is smaller than the absolute value of the focal length of the second lens.

3 Claims, 5 Drawing Sheets

PHOTOGRAPHIC LENS AND CAMERA

BACKGROUND OF THE INVENTION

1. Field of the Invention

The present invention relates to a photographic lens consisting of two lens groups each group consisting of a single lens element, and an economy camera using the photographic lens.

2. Background Arts

A wide variety of photographic cameras with different functions have been used for various purposes. Lens-fitted photo film units are well known as a cheap convenient camera that allows anyone to enjoy photography with ease. The lens-fitted photo film unit, hereinafter called simply as the film unit, has a unit body that contains a roll of unexposed photo filmstrip, and photographic mechanisms like a photographic lens and a shutter device are incorporated into the unit body. So the film unit permits photography from the moment it is purchased. For the development, it is not necessary to remove the exposed filmstrip from the unit body, but the film unit as the whole may be forwarded to a photofinisher.

In order to provide the film units at low prices, the manufacture cost is cut by making the construction of the film units as simple as possible. For instance, the photographic lens is fixedly held on a lens holder having a constant stop aperture size, and the focus of the photographic lens is adjusted such that photographs with average qualities may be obtained in most cases. A standard type film unit containing a conventional ISO-135 type photo film cartridge uses a photographic lens which is designed to have a focal length of about 32 mm, an f-number of about 9.5/f, and a half view angle of about 34°.

Recently, a new type photo film cartridge, called IX-240 type, has been brought into the market. The IX-240 type has a container with a spool that can contain the entire length of a photo filmstrip therein and advance the filmstrip to the outside in response to rotation of the spool. While the filmstrip of the ISO-135 type photo film cartridge has a width of 35 mm, the filmstrip of the IX-240 type photo film cartridge has a smaller width of 24 mm. Correspondingly, the frame size of the IX-240 type is smaller than that of the ISO-135 type. Therefore, a film unit containing the IX-240 type photo film cartridge have a photographic lens which is designed to have a focal length of about 24 mm, an f-number of about 9.5/f, and a half view angle of about 35°.

The photographic lenses used in the film units are usually plastic lenses formed from synthetic resins by injection molding, and are constituted of one or two lens elements. Recently, many film units adopt a two-group two-element construction photographic lens. As a popular two-group two-element photographic lens, there are a lens system consisting of two meniscus lenses with their concave surfaces facing each other, and a lens system consisting of a positive meniscus lens as the front lens element and a positive double-convex lens as the rear lens element. In either case, the front lens element disposed on the object side always has a smaller radius of curvature and a larger effective aperture than the rear lens element disposed on the image side.

Generally speaking, spherical lenses are more preferable than aspherical lenses, considering formability and optical accuracy. If, however, all lens surfaces of the two meniscus lens elements are spherical, the spherical aberration of the photographic lens increases so much that it is hard to correct or compensate. Besides, the f-number of the photographic lens is limited to at most 11/f, so that the image surface illuminance is very dark in this configuration.

Therefore, it is usual for the two-group two-element photographic lens to form the front surface of the front lens element alone or the front surface of the front lens element and the rear surface of the rear lens element to be aspherical. According to this configuration, the spherical aberration is well corrected, and the f-number of 9/f is achievable.

On the other hand, in the photographic lens having a double-convex lens as the front lens element, the spherical aberration is easy to correct, even if all lens surfaces are spherical. However, the curvature of the field becomes so bad that the image is damaged conspicuously on the fringe. Therefore, the front surface of the front lens element is formed to be aspherical so as not to worsen the curvature of the field.

Since the front lens must have a smaller radius of curvature and a larger effective aperture, even a slight variation in the forming process can damage optical performance of the lens. Because the aspherical surface is difficult to form with accuracy, it has been hard to maintain the optical performance of the above conventional photographic lens at a desired level.

When inspecting surface accuracy, an interferometer is usually used for spherical surfaces, and a surface roughness meter for aspherical surfaces. Depending upon the results of measurement, conditions of the forming machine are adjusted or corrected. As the inspection with the surface roughness meter takes more time and results less information in comparison with the inspection with the interferometer, it is difficult to precisely measure the surface roughness of the front lens that has a larger effective aperture. Therefore, it is difficult to maintain proper forming conditions.

There is another method of inspecting aspherical surfaces of lenses wherein a Null collector lens is combined with an aspherical lens to inspect, and an image formed through the Null collector lens and the aspherical lens is inspected. The Null collector lens is constituted of an aspherical lens and a glass spherical lens. For inspecting an aspherical lens having a short focal length and a large effective aperture like those used in the photographic lens, the Null collector lens is so difficult to design that this method is not practical.

SUMMARY OF THE INVENTION

In view of the foregoing, an object of the present invention is to provide a two-group two-element photographic lens whose image surface illuminance is bright, which is superior in formability, and which retains various aberrations.

Another object of the present invention is to provide a fixed focus camera that is suitable for the photographic lens of the invention.

To achieve the above object, a photographic lens of the present invention is comprised of a first meniscus lens element having a concave surface directed to the image, and a second meniscus lens element having a concave surface directed to the object, arranged in this order from the object side, both surfaces of the first lens element being spherical, and at least one surface of the second lens element being aspherical, wherein the photographic lens satisfies the following condition:

$|F1|<|F2|$ wherein F1 and F2 represent respective focal lengths of the first lens element and the second lens element.

According to this configuration, the spherical aberration is well corrected without worsening the curvature of the field.

By making both surfaces of the second lens element aspherical, the image surface illuminance is still more increased.

Since both surface of the first lens element, which is disposed in front of the object and has a shorter focal length and a larger effective aperture, are spherical surfaces on both sides, the formability of the first lens element is improved. Moreover, it becomes possible to inspect the first lens element with the interferometer that achieves highly accurate measurement and thus permits maintaining proper forming conditions for the first lens element.

Since the second lens element, which is disposed on the image side and has a longer focal length and a smaller effective aperture, it is unnecessary to maintain a high accuracy in forming the aspherical surface or surfaces of the second lens element, in order to achieve a sufficient optical performance. Moreover, as the second lens element has a longer focal length and a smaller effective aperture, it is easier to design a Null collector lens for inspecting the aspherical surface or surfaces of the second lens element, so that it is possible to measure the surface conditions of the second lens element with accuracy, and thus maintain proper forming conditions for the second lens element.

A camera of the present invention supports a filmstrip such that the film surface behind the photographic lens is forwardly concave along the lengthwise direction of the filmstrip.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limitative of the present invention, wherein like reference numerals designate like or corresponding parts throughout the several views, and wherein.

DETAILED DESCRIPTION OF THE PREFERRED EMBODIMENT

Figure 1:
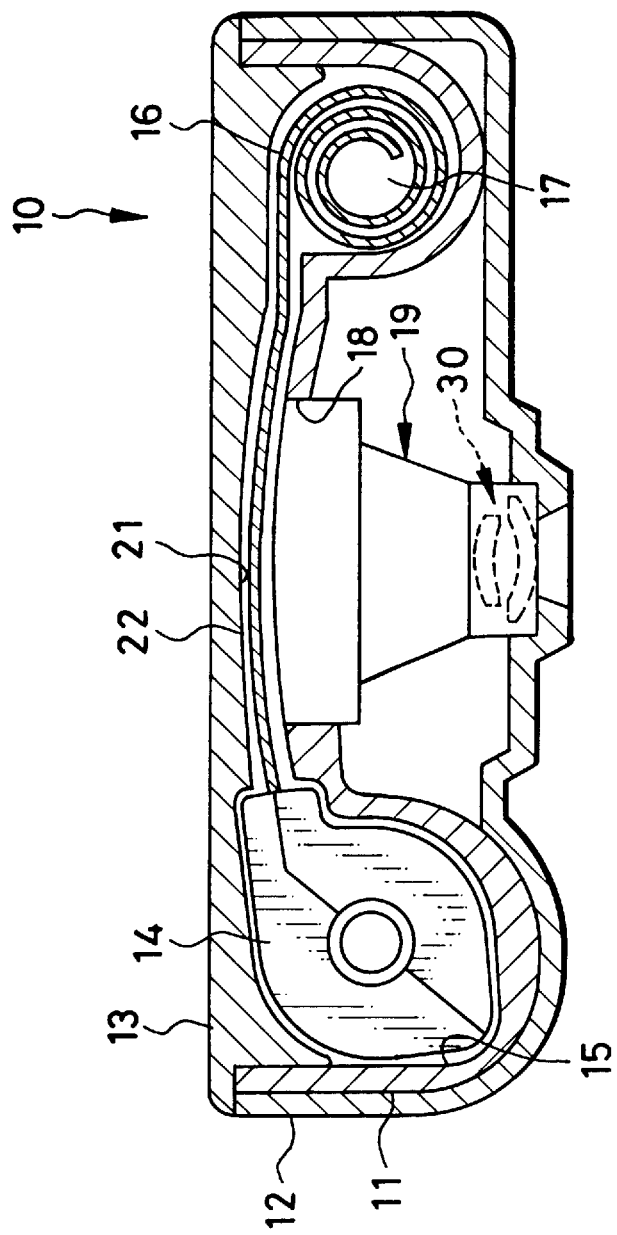
FIG. 1 is a horizontal sectional view of a unit body of a film unit according to an embodiment of the present invention.

In FIG. 1, a unit body 10 is constituted of a basic portion 11, and front and rear covers 12 and 13 that cover the basic portion 11 from the front and rear sides. The basic portion 11 is formed integrally with a cartridge chamber 15 for holding a cartridge shell 14 of a photo film cartridge, and a film roll chamber 17 for holding a roll of unexposed filmstrip 16 that is withdrawn from the cartridge shell 14 in the factory. An exposure aperture 18 is formed between the cartridge chamber 15 and the film roll chamber 17, to define a frame exposure area on the filmstrip 16. An exposure unit 19 having a photographic lens 30, a viewfinder optical system, a film advancing mechanism, a shutter mechanism and other photographic members assembled into one body unit is attached to the front of the exposure aperture 18. The exposure unit 19 is held between the front and rear covers 12 and 13.

A film supporting surface 21 is formed on the rear cover 13 in a portion behind the aperture 18. A gap between the film supporting surface 21 and a rear surface of the basic portion 11 constitutes a film passageway 22 between the film roll chamber 17 to the cartridge chamber 15. The filmstrip 16 is advanced one frame after each exposure from the film roll chamber 17 into the cartridge shell 14, so that the next unexposed portion is positioned behind the exposure aperture 18.

The film supporting surface 21 is curved to be forwardly concave along the advancing direction of the filmstrip 16. Complementarily to the concave film supporting surface 21, the rear surface of the basic portion 11 surrounding the exposure aperture 18 is curved to be convex. Correspondingly, the film surface positioned behind the exposure aperture 18 is curved to be forwardly concave.

Figure 2:
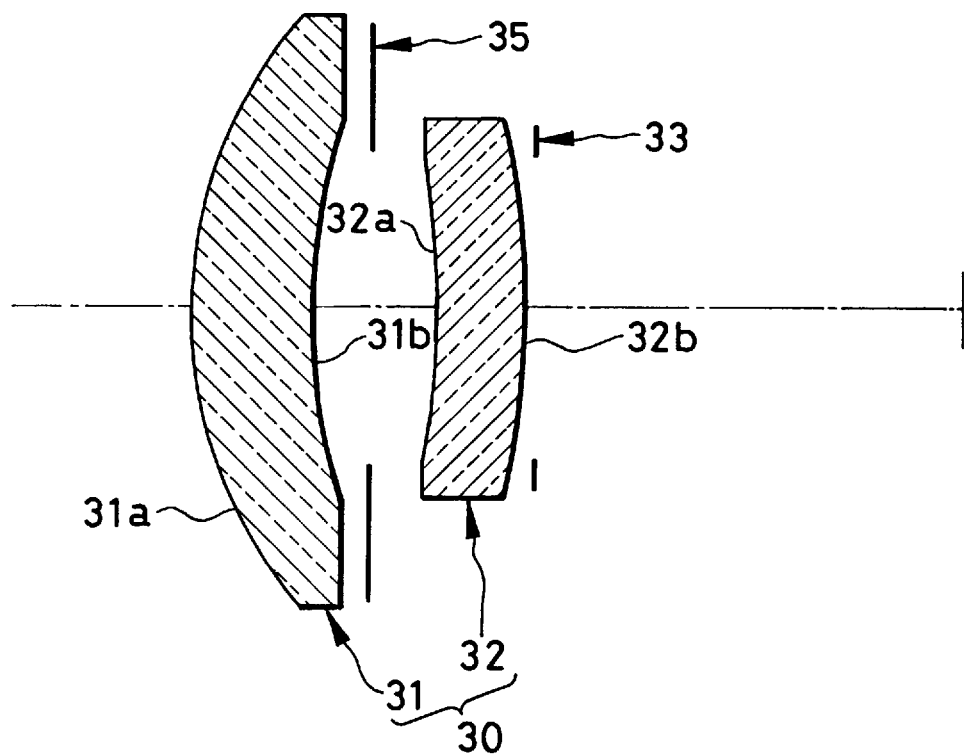
FIG. 2, 4, 6 and 8 are schematic diagrams showing photographic lenses according to Examples 1, 2, 3 and 4 of the present invention.

FIG. 2 shows a photographic lens 30 according to Example 1 of the present invention. The photographic lens 30 is constituted of a first meniscus lens 31 having a concave surface 31b directed to the image, and a second meniscus lens 32 having a concave surface 32a directed to the object. The concave surface 31b and the opposite surface 31a of the first lens 31 both are formed to be spherical. The concave surface 32a and the opposite surface 32b of the second lens 32 both are formed to be aspherical. Assuming that F1 and F2 represent respective focal lengths of the first lens 31 and the second lens 32, the photographic lens 30 satisfies the condition $|F1|<|F2|$. The photographic lens 30 is placed before a stop aperture 33 in the order from the object side. A light-shielding plate 35 for limiting the incident light path is disposed between the first and second lenses 31 and 32.

Figures 3A, 3B:
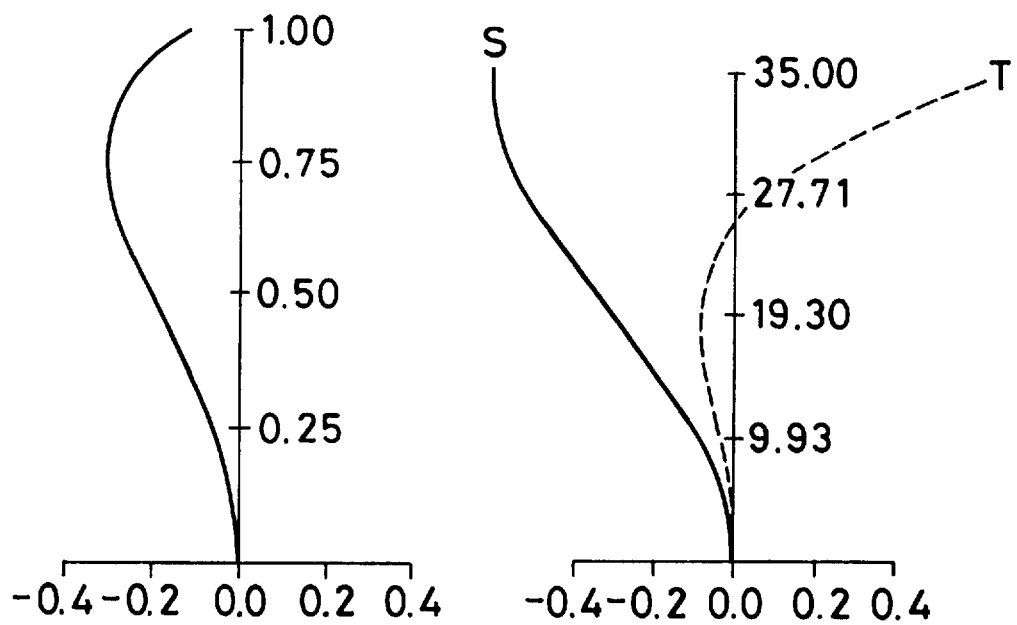
FIGS. 3A, 5A, 7A and 9A are diagrams showing spherical aberrations of the photographic lenses of Examples 1, 2, 3 and 4 of the present invention respectively.
FIGS. 3B, 5B, 7B and 9B are diagrams showing astigmatism of the photographic lenses of Examples 1, 2, 3 and 4 of the present invention respectively.

FIGS. 3A and 3B show the spherical aberration and the astigmatism of Example 1 respectively, wherein S and T in FIG. 3B represent the aberrations with respect to the sagittal image surface and the tangential image surface respectively.

As the curvature of the sagittal image surface is not strictly equal to the curvature of the tangential image surface, strict illustration of the aberrations with respect to these two image surfaces in the same graph would be very complicated. Therefore, the aberrations are measured on the assumption that the image surface was a spherical surface having a radius of curvature shown in the following tables.

Since the film surface of the filmstrip that forms the image surface is forwardly concave along the lengthwise direction only, the image surface is not strictly spherical. Therefore, a curvature of the image surface that is measured in the diagonal direction is shown as the radius of curvature of the image surface in the following tables.

Figure 4:
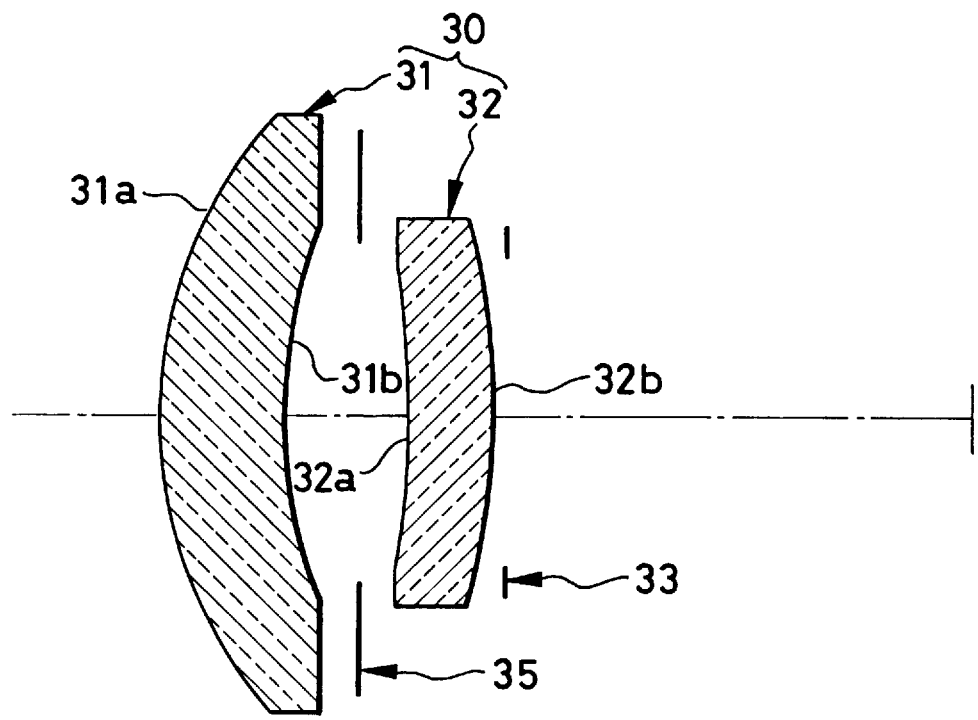
Figures 5A, 5B:
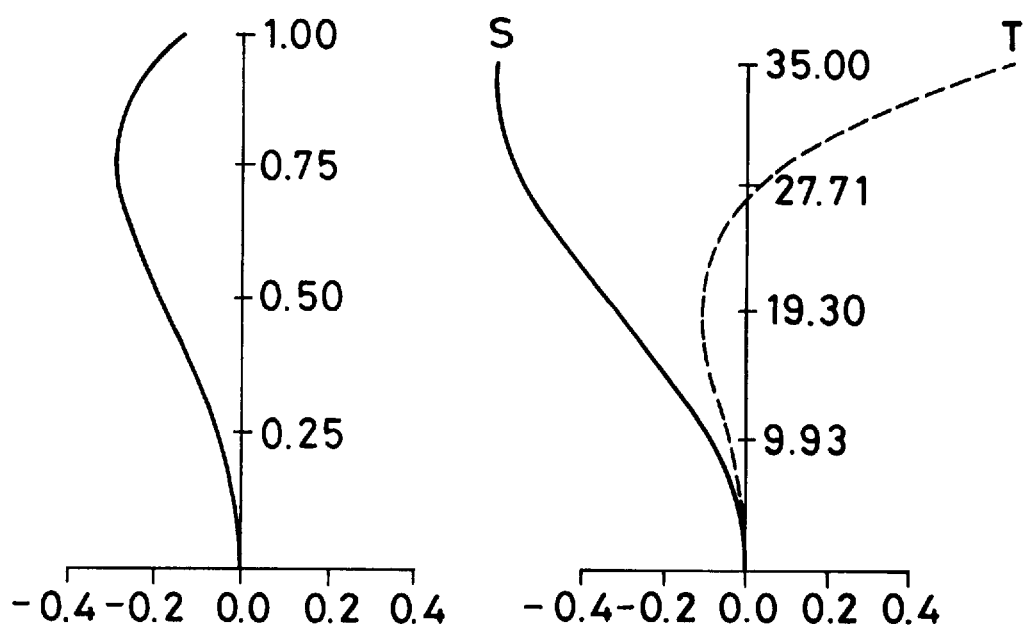

FIG. 4 shows a photographic lens 30 according to Example 2. Example 2 has the same configuration as Example 1. FIGS. 5A and 5B show the spherical aberration and the astigmatism of Example 2 respectively.

Figure 6:
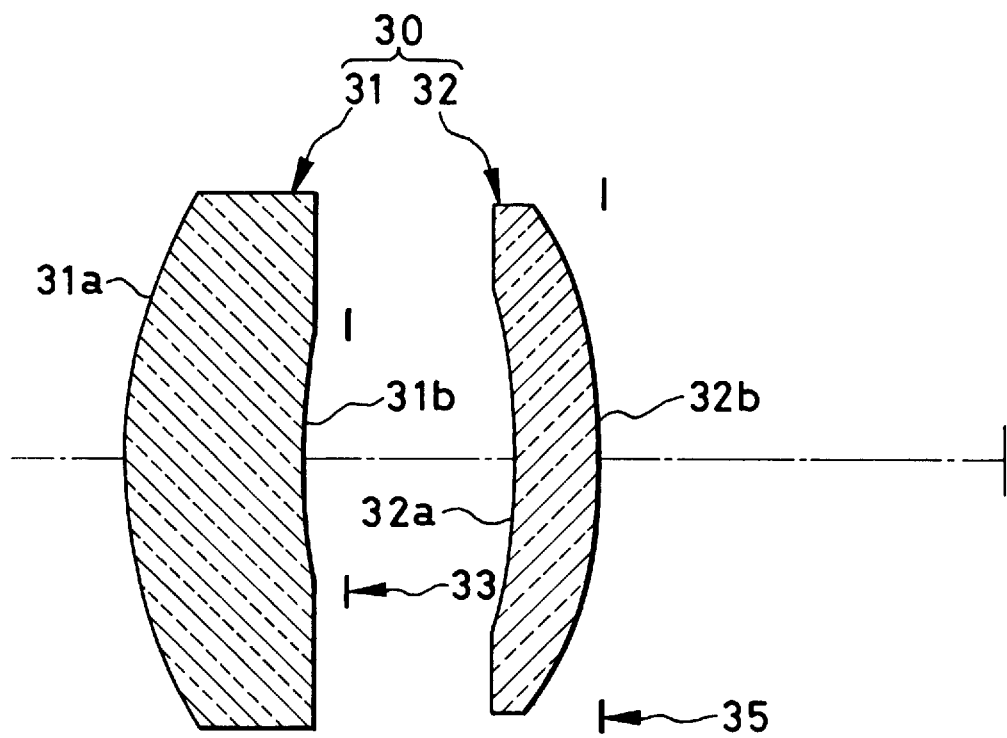
Figure 7A:
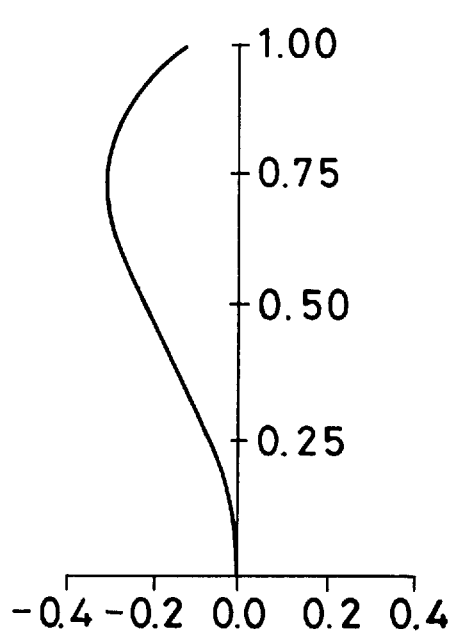
Figure 7B:
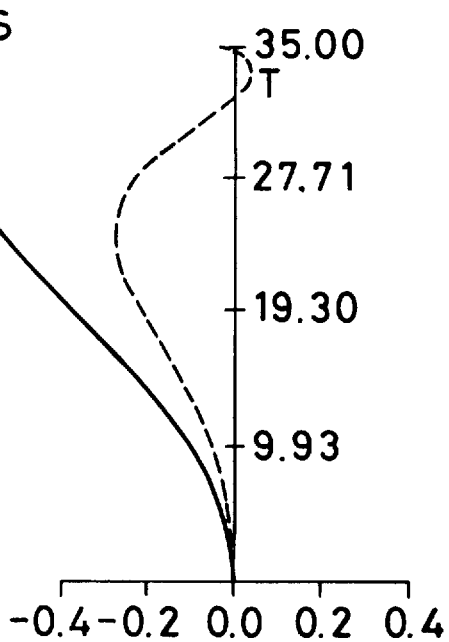

FIG. 6 shows a photographic lens 30 according to Example 3 that has fundamentally the same configuration as Example 1, except but a stop aperture 33 is disposed between first and second lenses 31 and 32, and a light-shielding plate 35 is placed behind the photographic lens 30 in the order from the object side. FIGS. 7A and 7B show the spherical aberration and the astigmatism of Example 3 respectively.

Figure 8:
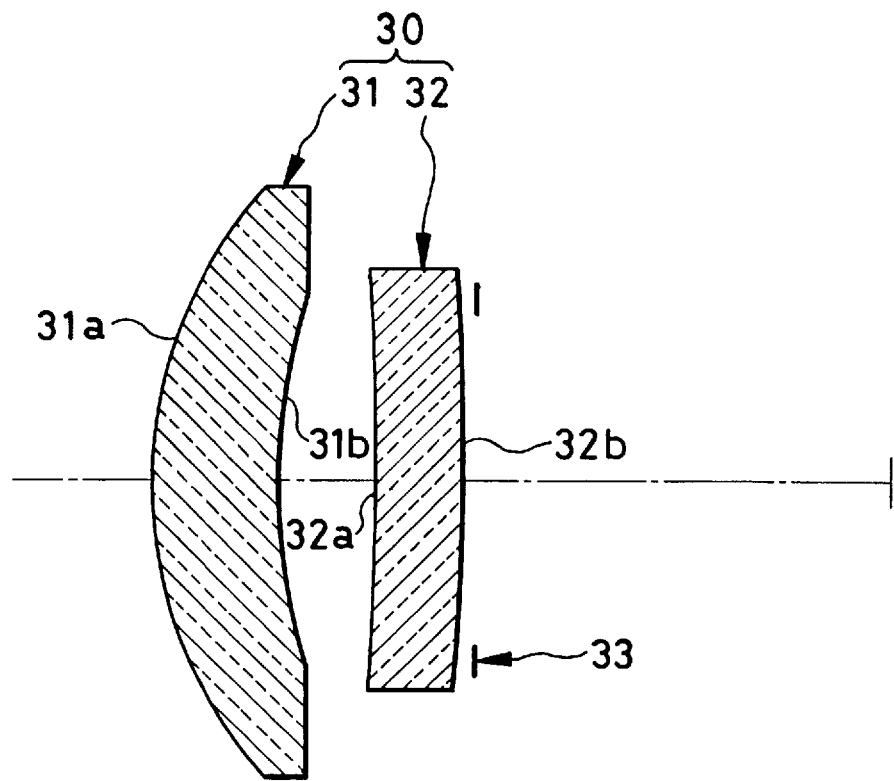
Figure 9A:
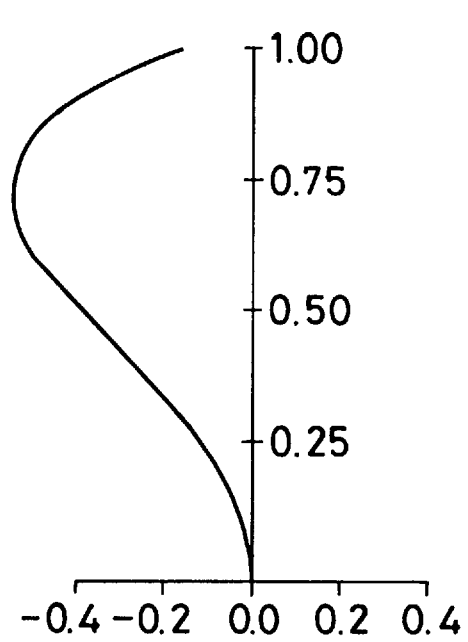
Figure 9B:
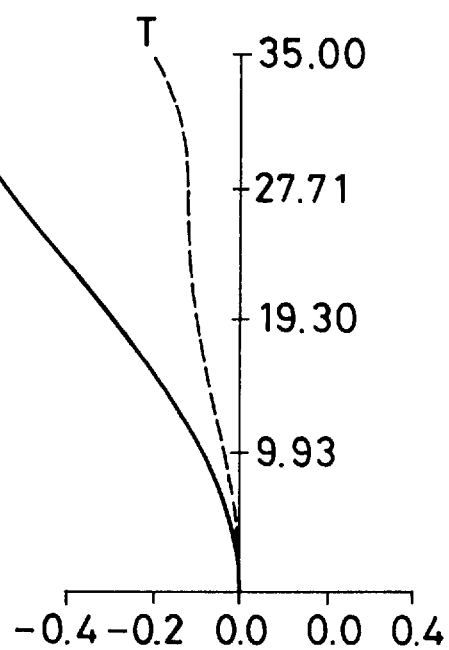

FIG. 8 shows a photographic lens 30 according to Example 4, wherein only a rear surface 32b of a second lens 32 is formed to be aspherical, and a stop aperture 33 is placed behind the photographic lens 30 in the order from the object side. Furthermore, there is not any light-shielding plate. FIGS. 9A and 9B show the spherical aberration and the astigmatism of Example 4 respectively.

Numerical values for Examples 1 to 4 shown in FIGS. 2, 4, 6 and 8 will be described below. Designated at F is the focal length of the photographic lens 30 as the whole, F1 the focal length of the first lens 31, F2 the focal length of the second lens 32, f the f-number, and ω the half view angle. Designated at i is the surface number indicating a serial number of respective surfaces of lens elements in the order from the object side, D the thickness of lens elements or air space between adjacent lens elements, R the radius of curvature, N the refractive index, ν the Abbe number, and r the effective radius.

The aspherical surfaces are specified by the following equation:

$$Z = ch^2/[1+\sqrt{1-(1+K)c^2h^2}] + Ah^4 + Bh^6 + C'h^8 + Dh^{10}$$

wherein c is a reciprocal number of the radius of curvature (c = 1/R), h is the height of light path from the optical axis, and K, A, B, C' and D are aspherical coefficients.

EXAMPLE 1

F=24 mm
F1=36.07 mm
F2=59.11 mm
f=8.0/f
ω=35°

| i | R | D | N | ν | r |
|---|---|---|---|---|---|
| 1 | 4.101 | 1.08 | 1.492 | 57.5 | 2.20 |
| 2 | 4.864 | 0.68 | | | 1.71 |
| 3 | shielding plate | 0.45 | | | 1.40 |
| 4 | −9.49675 (aspherical) | 0.78 | 1.492 | 57.5 | 1.34 |
| 5 | −7.36004 (aspherical) | 0.10 | | | 1.35 |
| 6 | stop | 21.284 | | | 1.34 |
| 7 | −105.98 | | | | |

Aspherical coefficients of the aspherical surfaces of the second lens of Example 1 are as follows:

| i | 4 | 5 |
|---|---|---|
| K | 0.035416 | −0.063398 |
| A | −0.242458E−02 | −0.168638E−02 |
| B | 0.313087E−03 | 0.535723E−03 |
| C' | 0 | 0 |
| D | 0 | 0 |

EXAMPLE 2

F=24 mm
F1=37.56 mm
F2=54.76 mm
f=7.5/f
ω=35°

| i | R | D | N | ν | r |
|---|---|---|---|---|---|
| 1 | 4.2116 | 1.17 | 1.492 | 57.5 | 2.31 |
| 2 | 4.948 | 0.703 | | | 1.77 |
| 3 | shielding plate | 0.469 | | | 1.48 |
| 4 | −9.217 (aspherical) | 0.782 | 1.492 | 57.5 | 1.42 |
| 5 | −7.067 (aspherical) | 0.10 | | | 1.44 |
| 6 | stop | 21.20 | | | 1.42 |
| 7 | −105.98 | | | | |

Aspherical coefficients of the aspherical surfaces of the second lens of Example 2 are as follows:

| i | 4 | 5 |
|---|---|---|
| K | 0.90773 | 2.808665 |
| A | −0.266035E−02 | −0.904692E−03 |
| B | 0.308938E−03 | 0.512393E−03 |
| C' | 0 | 0 |
| D | 0 | 0 |

EXAMPLE 3

F=24 mm
F1=36.62 mm
F2=51.93 mm
f=7.5/f
ω=35°

| i | R | D | N | ν | r |
|---|---|---|---|---|---|
| 1 | 5.872 | 2.114 | 1.492 | 57.5 | 2.71 |
| 2 | 7.532 | 0.566 | | | 1.55 |
| 3 | stop | 2.00 | | | 2.39 |
| 4 | −10.406 (aspherical) | 1.01 | 1.492 | 57.5 | 2.09 |
| 5 | −7.6417 (aspherical) | 0.20 | | | 2.57 |
| 6 | shielding plate | 19.372 | | | 3.06 |
| 7 | −105.98 | | | | |

Aspherical coefficients of the aspherical surfaces of the second lens of Example 3 arc as follows:

| i | 4 | 5 |
|---|---|---|
| K | −12.484457 | 4.447235 |
| A | −0.156111E−02 | 0.111805E−02 |
| B | 0.523371E−03 | −0.150129E−03 |
| C' | 0 | 0 |
| D | 0 | 0 |

EXAMPLE 4

F=24 mm
F1=29.77 mm
F2=103.89 mm f=8.0/f
ω=35°

| i | R | D | N | ν | r |
|---|---|---|---|---|---|
| 1 | 3.548 | 1.01 | 1.492 | 57.5 | 1.94 |
| 2 | 4.236 | 0.79 | | | 1.48 |
| 3 | −36.07 | 0.71 | 1.585 | 29.9 | 1.34 |
| 4 | −22.87 (aspherical) | 0.10 | | | 1.32 |
| 5 | stop | 20.80 | | | 1.31 |
| 6 | −105.98 | | | | |

Aspherical coefficients of the aspherical surfaces of the second lens of Example 4 are as follows:

| i | 4 |
|---|---|
| K | 0 |
| A | 0.424221E−03 |
| B | 0.470105E−03 |
| C | 0 |
| D | 0 |

The photographic lens of the present invention is not only applicable to the film unit as shown in FIG. 1, but also to other type film units or fixed focus cameras. In either case, it is preferable to support the film surface to be forwardly concave along the lengthwise direction of the filmstrip in view of minimizing the curvature of the field.

The present invention is not to be limited to the above Examples but, on the contrary, various modifications may be possible to those skilled in the art without departing from the scope of claims attached hereto.

What is claimed is:

1. A photographic lens comprising a first meniscus lens element having a concave surface directed to the image, and a second meniscus lens element having a concave surface directed to the object, arranged in this order from the object side, wherein both surfaces of the first lens element are spherical, and at least one surface of the second lens element is aspherical, and wherein the photographic lens satisfies the following condition:

$|F151| < |F2|$ wherein F1 and F2 represent respective focal lengths of the first lens element and the second lens element.

2. A fixed focus camera comprising:
 a photographic lens whose focus is fixed, the photographic lens comprising a first meniscus lens element having a concave surface directed to the image, and a second meniscus lens element having a concave surface directed to the object, arranged in this order from the object side, both surfaces of the first lens element being spherical, at least one surface of the second lens element being aspherical, the photographic lens satisfying the following condition:

$|F1| < |F2|$ wherein F1 and F2 represent respective focal lengths of the first lens element and the second lens element; and
 a film supporting device for supporting a film surface of a filmstrip as an image surface of the photographic lens, such that the film surface is curved to be forwardly concave along the lengthwise direction of the filmstrip.

3. A fixed focus camera according to claim 2, wherein the filmstrip is 24 mm in width, and the photographic lens has a focal length of 24 mm, and a half view angle of 35°.

* * * * *